United States Patent [19]
Schultz et al.

[11] 3,801,294
[45] Apr. 2, 1974

[54] METHOD OF PRODUCING GLASS

[75] Inventors: Peter C. Schultz, Painted Post; Francis W. Voorhees, Bath, both of N.Y.

[73] Assignee: Corning Glass Works, Corning, N.Y.

[22] Filed: Dec. 15, 1971

[21] Appl. No.: 208,168

[52] U.S. Cl. ............... 65/18, 65/21, 423/337, 423/592
[51] Int. Cl. ............... C01b 33/12, C03c 17/00
[58] Field of Search ........... 423/337, 592, 606, 608, 423/625; 106/52; 65/21, 33

[56] References Cited
UNITED STATES PATENTS

| | | | |
|---|---|---|---|
| 2,239,551 | 4/1941 | Dalton et al. | 65/33 |
| 2,272,342 | 2/1942 | Hyde | 65/21 |
| 2,326,059 | 8/1943 | Nordberg | 106/52 |
| 2,823,982 | 2/1958 | Saladin et al. | 423/337 |
| 3,043,660 | 7/1962 | Hughes et al. | 423/337 |
| 3,486,913 | 12/1969 | Zirngibl et al. | 423/337 X |

*Primary Examiner*—Robert L. Lindsay, Jr.
*Attorney, Agent, or Firm*—Clinton S. Janes, Jr.

[57] ABSTRACT

An improved method is described for the production of glass by the decomposition of a mixture of glass forming compounds in the flame of a combustible gas to form an oxide mixture which is vitrified. The improvement includes generating vapors from a decomposable solid material that has a vapor pressure equal to 5 mm. Hg at a temperature above ambient temperature but not over 500°C. The vapors are generated by suspending the material in finely divided form in a heated chamber and passing a carrier gas through the material. The method is especially useful in the production of modified vitreous silica glasses.

7 Claims, 1 Drawing Figure

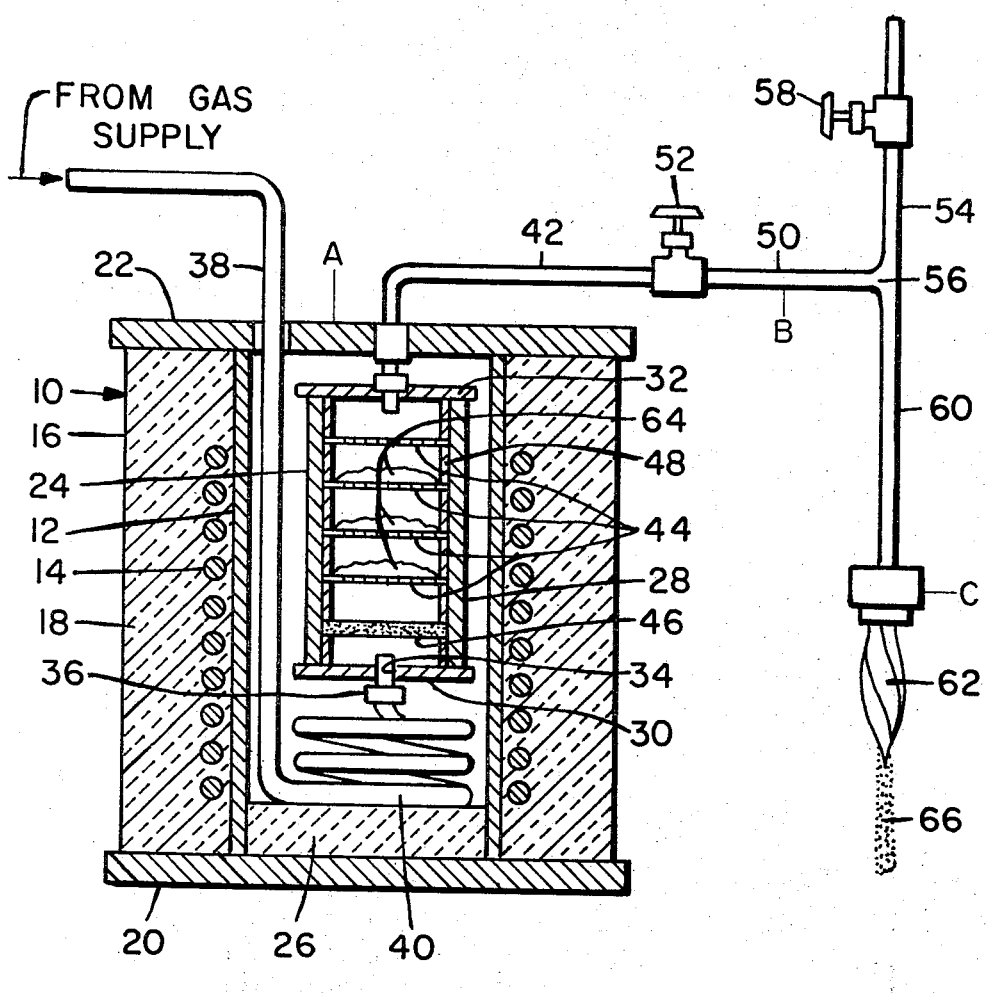

METHOD OF PRODUCING GLASS

This invention is an improvement in the method of making glass wherein a gaseous mixture of glass forming compounds is decomposed in a flame of combustible gas to produce a mixture of finely divided oxides which is vitrified. The improvement is particularly concerned with a novel method of generating vapors of solid compounds which have extremely low vapor pressures under ambient conditions.

U.S. Pat. No. 2,272,342, granted to J. F. Hyde on Feb. 10, 1942, describes a method of producing a transparent silica article by vaporizing a hydrolyzable compound of silicon into a flame of combustible gas to form finely divided silica particles which are then vitrified. The vitrification may take place as the particles are deposited, or may constitute a subsequent and separate heat treatment. A number of different hydrolyzable compounds containing silicon are disclosed including silicon chloride. Vapors are generated by heating the liquid in a water bath, and a carrier gas may be passed through the liquid.

U.S. Pat. No. 2,326,059, granted to M. E. Nordberg on Aug. 3, 1943, describes a modification of the Hyde process wherein mixtures of hydrolyzable compounds, in particular mixtures of titanium and silicon chlorides, are employed to produce $SiO_2$-$TiO_2$ glasses. The halide vapors are generated separately from heated flasks and mixed in a delivery tube or generated from a liquid mixture in a single flask. The vapor mixture is then delivered to a flame of combustible gas for decomposition of the hydrolyzed vapor mixture to a corresponding oxide mixture.

The procedure of the Nordberg patent has proven very useful in the production of $SiO_2$-$TiO_2$ glasses having extremely low coefficients of thermal expansion. However, this vapor delivery technique is limited in its application because of the limited availability of readily vaporizable compounds. Thus, the compounds of many cations, e.g., the chlorides of zirconium, aluminum, tantalum and niobium, have extremely low vapor pressures at ambient temperatures, and even at temperatures up to the boiling point of water (100°C.).

U.S. Pat. No. 2,239,551, granted Apr. 22, 1941 to R. H. Dalton et al., describes a method of producing a mixture of hydrolyzable compounds that are decomposable to oxides wherein at least one of the compounds has a low vapor pressure under normal conditions. In this method, the desired compound is placed in a crucible in powder form and heated in a furnace to a temperature at which vapors form. The vapors from the crucible may be picked up by a second compound, such as silicon chloride, or by a carrier gas passed over the crucible.

In practice, we have encountered certain unsatisfactory results using the Dalton et al. technique. Apparently, only a limited amount of vapor is generated from the small exposed surface area of the vaporizable compound and picked up by the gas passing over the crucible in the furnace. The vapor yield can be increased by heating the furnace to a temperature at which the compound melts, or even higher, but this necessitates maintaining such elevated temperature throughout the system to avoid condensation. More important, composition control becomes difficult because the vapor pressure varies radically with small temperature changes at such elevated temperatures.

A primary purpose of the present invention is to provide a method of producing oxides by flame hydrolysis that eliminates these prior problems. A more specific purpose is to provide a method of generating relatively large and controlled quantities of hydrolyzable vapors from solids that have a very low vapor pressure at ambient temperature. A further purpose is to provide an improved method of producing mixed oxide glasses by the flame hydrolysis technique. Another purpose is to provide a wider range of modified vitreous silica glasses by the flame hydrolysis technique than has heretofore been practical to produce.

We have now discovered a method of generating copious quantities of vapor from a solid that has a vapor pressure less than 5 mm. Hg at ambient temperature (about 25°C.), but at least 5 mm. Hg at 500°C. This novel method is based on the principle of passing a carrier gas through, rather than over, a vaporizable solid. We have found that this provides much greater surface area contact between the carrier gas and the solid, and thereby much greater vapor pick up from such contact.

On this basis, our invention is a method for producing a glass by decomposing a mixture of glass forming compounds in a flame of combustible gas to form an oxide mixture and vitrifying the resultant oxide mixture comprising the steps of suspending a finely divided material within a chamber, said finely divided material including at least one decomposable glassmaking compound having a vapor pressure of 5 mm. Hg at a temperature about ambient temperature but not over 500°C., heating the chamber to an elevated temperature not over 500°C., and passing a carrier gas through the finely divided material to pick up and carry vapors thereof to the flame of combustible gas. As in prior flame hydrolysis methods, the oxides formed may be deposited directly as a solid vitreous mass. Alternatively, they may be deposited in particulate form and subsequently consolidated to a solid mass by suitable heat treatment.

The finely divided material is preferably suspended in thin layers on a series or plurality of perforated support members, or screens, spaced at different levels in a vertical, closed container. Alternatively, a layer on a single screen may be adequate for some purposes. The carrier gas will generally be passed upwardly through the material as a matter of convenience, but it is contemplated that the gas may be passed downwardly as well if this proves desirable. Finally, the container may be positioned horizontally in which case the divided material may fill the container, or may be held in one or more thin layers by opposed screens.

The particle size is not critical, and optimum size will increase with the size of the apparatus used. In general, too fine a material will interfere with gas passage whereas too coarse a material will not provide sufficient surface area for vapor generation. In operating a small system adapted to produce approximately one half pound of oxide per hour from the hydrolysis process, we find particles having sizes in the range of 50 to 2,500 microns satisfactory, but prefer a particle size range of 150 to 500 microns. A larger system would use a somewhat higher range.

The present method may employ any material having a vapor pressure equal to 5 mm. Hg at a temperature above ambient temperature, but not over about 500°C. It has proven particularly useful in producing vapors from compounds which have a vapor pressure of 5 mm. Hg at a temperature in the range 100°C. to 500°C.

Materials having a vapor pressure equal to 5 mm. Hg at a temperature between ambient and 100°C. may generate sufficient vapor without heating, or may be heated in a water bath in accordance with prior art methods described above. Materials having a vapor pressure less than 5 mm. at 500°C. generally do not develop sufficient vapor pressure below their melting temperature in order to permit use of the material by the present technique. Where such higher melting temperature materials are employed, it is desirable to maintain the material in a molten state in a specially heated system and to pass a carrier gas through the molten bath to carry off vapors generated therefrom.

Any material having a sufficiently high vapor pressure below its melting point may be used. In addition to halides, these include such compounds as organometallics. However, the metal halides are particularly suitable, in particular the chlorides. By way of illustration, mention may be made of aluminum chloride ($AlCl_3$), tantalum chloride ($TaCl_5$), zirconium chloride ($ZrCl_4$), tungsten chloride ($WCl_6$), beryllium chloride ($BeCl_2$), tin chloride ($SnCl_2$), and iron chloride ($FeCl_3$).

Normally, a gas not involved in the hydrolysis process is used as a carrier gas. Nitrogen and oxygen are particularly useful, but any gas which will not react with the compound being vaporized can be used. In some instances, a separate vapor stream, e.g., a carrier gas carrying silicon halide vapor, may be used as the pick up gas stream that is passed through the finely divided material. However, condensation problems, as well as proportion control problems, usually make this impractical. It is also possible to employ a stream of the combustible gas used in the burner as the carrier gas. We find though that this may lead to premature oxide deposition at the burner tip, and consequent clogging. Therefore, such practice is usually avoided.

In the preferred method for carrying out the invention, a vertical container is provided with a series of screens, or otherwise suitably perforated support members, that are vertically spaced, preferably equidistant, within the chamber. While a single support member may be employed, it is generally desirable to employ a plurality. A suitably selected, vaporizable material is placed on each support or screen in finely divided form and the chamber is heated to a temperature at which this material has a vapor pressure greater than 5 mm., the temperature not exceeding 500°C. A carrier gas is then introduced into the bottom of the chamber and allowed to pass through the finely divided solid thus picking up vapors generated from the surface of such material. The vapors picked up may then be mixed with vapors from one or more other sources and the mixture conveyed to a flame of combustible gas where the vapor mixture is hydrolyzed and decomposed to the desired oxide mixture in accordance with known flame hydrolysis technique.

The invention is further described, for illustrative purposes, with respect to a specific embodiment thereof and with reference to the accompanying drawing which illustrates a vapor generator and delivery system suitable for use in practice of the invention.

The drawing illustrates, schematically, an apparatus composed of three general subassemblies, a vapor generator A, a delivery system B, and a burner C. The delivery system and burner are essentially conventional in nature and hence are described only in general terms.

Vapor generator A comprises a tube furnace 10 including an inner refractory core 12, an electric heating element 14 wound on the outer surface of core 12, an outer shell 16 preferably composed of stainless steel, and an insulating material 18 packed between shell 16 and core 12. Tube furnace 10 is closed at one end with bottom plate 20 and at the other end with top plate 22. Each of these may be composed of pressed asbestos board, or other suitable heat insulating material.

Vapor generator A further includes generating chamber 24 which rests on refractory block 26. The latter may snugly fit within the bottom end of core 12 and rest against bottom plate 20 of tube furnace 10. Generating chamber 24 includes a tubular shell 28, a bottom plate 30, and a top plate 32, each of which may be composed of stainless steel. Bottom plate 30 is provided with a central opening 34 into which is fitted a tubing connection 36 to connect inlet tube 38 with the chamber. Inlet tube 38 has a coiled portion 40 having a dual purpose to be described later. Top plate 32 is also fitted with a pipe connection to connect chamber 24 with delivery system B through outlet tube 42.

Vapor generating chamber 24 is provided with perforated support plates 44 which may for example be composed of 100 mesh stainless steel screen. As explained earlier, a single support plate may suffice for some purposes, but generally a suitable apparatus will include a plurality as here shown. Desirably a porous metal plate 46, e.g., a 30 micron porous nickel plate, is provided near the bottom of shell 28. Plates 44 and 46 fit snugly within shell 28 and are spaced apart, preferably equidistantly, by steel ring bushings 48. This insures against gas leakage around the edges, and a tightly sealed chamber may be further insured by providing end plates 30 and 32 with synthetic rubber O-rings (not shown) capable of withstanding a temperature of 500°C.

Vapor delivery system B includes a length of steel tubing 50 connected to outlet delivery tube 42 with a valve 52. Tube 50 joins with tube 54 at T-joint 56, tube 54 being connected through valve 58 with a second generator not shown. T-joint 56 is connected to burner C by tube 60. The burner may for example be a conventional gas oxygen burner adapted to generate a hot combustible gas flame 62 in which the vapors hydrolyze.

In operation, vapor generator chamber 24 is so designed that the pipe connections may be disassembled and the chamber removed from the furnace. In turn, each of support plates 44 may be removed and covered with a layer of suitably selected finely divided material 64 to be vaporized. Chamber 24 is then reassembled with plates 44, and porous metal plate 46 if present, spaced apart by spacers 48. The generating chamber is then reinserted into the tubular furnace with the pipe connections being remade.

Furnace 10 is then operated at a selected temperature in the range up to 500°C., depending on the material selected. A carrier gas, such as dry nitrogen or oxygen, is introduced through inlet tube 38. The coiled portion 40 of inlet tube 38 serves the dual purpose of providing a physical support for generating chamber 24 and also providing preheating of the carrier gas introduced through inlet tube 38. If porous metal plate 46 is present, it serves to evenly disperse the carrier gas flow laterally across chamber 24. The carrier gas then passes upwardly through the heated particulate material 64 resting on the perforated plates 44 and picks up quantities of vapor therefrom. The vapor-carrier gas mixture then passes out through outlet tube 42.

The flow of vapor into delivery system B may be suitably controlled by valve 52. Likewise, the flow of a second vapor, such as silicon chloride ($SiCl_4$) from a source not shown may be controlled by valve 58. The two vapor streams thus controlled meet and mix into a single stream at T-joint 56, thereafter passing through tube 60 to burner C. In known manner, the vapors are hydrolyzed in the burner assembly to form the corresponding oxides in flame 62 of combustible gas provided by the burner.

If burner C is suitably adjusted to a sufficiently high temperature, the oxide mixture 66 delivered from flame 62 will be in vitreous form and may be collected in any suitable manner to form a glass article. If flame 62 is adjusted to a somewhat lower temperature, the oxide mixture emanating from flame 62 may be in particulate, powder form and may be deposited on a suitable mandrel or other support to form a dense solid body. This in turn may subsequently be vitrified in known manner by suitable heat treatment.

carried such vapors through delivery system B to T-joint 56 where the $ZrCl_4$-$O_2$ mixture met a stream of silicon tetrachloride ($SiCl_4$)-oxygen generated independently and introduced at a flow rate of 1,700 cc./min. by valve 58. The mixture thus produced was passed into burner C where hydrolysis and decomposition took place to provide a resultant soot or particulate powder mixture containing 4.0 wt.% $ZrO_2$ and 96.0 wt.% $SiO_2$. This powder was collected on a mandrel and the form thus produced was consolidated into a transparent glass of good quality by heating the preform, for example, in a gas-oxygen flame.

The table that follows summarizes corresponding data for several other compounds from which vapors were generated and mixed with $SiCl_4$ vapors to produce a mixed oxide glass in accordance with the present invention. The table lists the compound employed; the respective temperatures in °C. at which chamber 24, line 42 and burner C were maintained; the vapor pressure in mm. Hg of the compound at the chamber temperature; the flow rate of carrier gas in vapor generator A in cc./min.; the corresponding flow rate of $SiCl_4$ through valve 58; and, finally, the composition, in percent by weight on an oxide basis, of the glass produced (only the additive oxide being given, the remainder being $SiO_2$).

TABLE

| Compound | Temperature °C. | | | Flow Rates (cc./min.) | | | |
|---|---|---|---|---|---|---|---|
| | Chamber | Line | Burner | VP(mm.Hg) | Compound | $SiCl_4$ | Oxide Wt.% |
| $AlCl_3$ | 139 | 190 | 190 | 40 | 2650 | 1340 | 5.8 |
| $TaCl_5$ | 160 | 300 | 240 | 15 | 1300 | 3450 | 3.8 |
| $NbCl_5$ | 165 | 285 | 280 | 25 | 2350 | 3400 | 3.3 |
| $MoCl_5$ | 140 | 330 | 255 | 15 | 2350 | 2180 | .010* |
| $ZrCl_4$ | 252 | 290 | 275 | 30 | 2900 | 1700 | 4.0 |
| $BeCl_2$ | 300 | 350 | 315 | 5 | 1850 | 1640 | 4.8 |
| $WCl_6$ | 218 | 290 | 240 | 40 | 2350 | 1930 | 0.6* |

*Vaporized during glass deposition; therefore percent content lower than expected.

By way of further illustrating practice of the invention with the particular apparatus shown in the drawing, finely divided zirconium chloride ($ZrCl_4$) was loaded on screens 44 to a depth of approximately 1/8 inch. Inlet and outlet delivery tubes were attached and the vapor generating assembly heated to a temperature of 252°C. within tube furnace 10. This material has a vapor pressure of only $10^{-6}$ atmosphere (0.00076 mm. Hg) at 100°C., but has a vapor pressure of 30 mm. Hg at 252°C.

It may be noted at this point that outlet tube 42 and delivery system B must be thermally insulated and maintained at a temperature at, or preferably above, the operating temperature of the generating assembly. This is necessary to avoid condensation in the line. In the present operation, outlet tube 42 and delivery system B, as well as the tubing connection to the burner, were maintained at a temperature of 290°C. while burner C was maintained at 275°C.

The burner flame was lit to provide moisture and heat for proper hydrolysis of the incoming vapors when valve 52 was opened. Meanwhile, oxygen was being supplied through delivery tube 38 at a flow rate of 2,900 cc./min., this gas being preheated in coil 40 before entering chamber 24. As the carrier passed upwardly through the zirconium tetrachloride powder, it became saturated with vapors from this powder and The foregoing table illustrates the use of several different suitable chlorides for the purposes of the invention. If desired, one working in this art can readily substitute other vaporizable metal compounds having similar characteristics.

For example, zirconium iodide ($ZrI_4$) has a vapor pressure of 30 mm. of Hg at 339°C. and zirconium bromide ($ZrBr_4$) has a vapor pressure of 30 mm. of Hg at 276°C. If one suitably adjusts the chamber, line, and burner temperatures, and maintains flow rates as indicated in the above table, either of these compounds may be substituted for $ZrCl_4$ to produce the glass composition shown in the table.

Likewise, beryllium bromide ($BeBr_2$) has a vapor pressure of 5 mm. of Hg at 325°C. This compound could then be substituted for $BeCl_2$, to produce the $SiO_2$-$BeO$ glass composition shown in the table by increasing the chamber, line, and burner temperatures 25°C. each and maintaining the indicated flow rates.

Attempts to employ this method with other compounds, in which a vapor pressure of 5 mm. Hg occurs above 500°C., have proven generally unsuccessful. For example, $MgCl_2$, $NiCl_2$ and $MnCl_2$ have been tried without success. These, respectively, have vapor pressures of 5 mm. Hg at about 877°C., 731°C. and 736°C.

It will be appreciated that, while a specific apparatus and a specific material mixture have been described, this has been solely for purposes of illustration and the scope of the invention is limited only by the claims that follow. In particular, the invention may be practiced by generating two or more separate sources of material in generators such as illustrated by generator 24 and thereafter mixing the vapor streams generated. In some cases, it is also possible to properly proportion a mixture of solid materials, on the basis of their respective vapor pressures, so that a suitable vapor mixture may be picked up by a single stream of carrier gas. Also, as indicated earlier, a wide variety of vaporizable and hydrolyzable materials may be employed in practice of the present invention. Finally, it is well within the skill of the art to devise various modifications of the specific elements shown in the apparatus above while still employing the principles of the invention.

We claim:

1. In a method for producing a glass body wherein a mixture of compounds which are capable of being hydrolyzed and decomposed into glass forming oxides is introduced into a flame of combustible gas to form finely-divided particles which are vitrified and wherein at least one of said compounds has a vapor pressure of 5 mm. Hg at a temperature above ambient temperature but not over about 500°C., the improvement which comprises generating vapors from said compound comprising the steps of:

a. suspending said compound in finely-divided particulate form within a chamber;
   b. heating said compound within said chamber to a temperature above ambient temperature but not over 500°C. to generate vapors thereof; and then
   c. passing a carrier gas through said compound in finely-divided form to pick-up and carry vapors thereof to a flame of combustible gas.

2. The method of claim 1 wherein the glass produced is a modified vitreous silica glass.

3. The method of claim 1 wherein the mixture of glass forming compounds decomposed in a flame is a mixture of halides.

4. The method of claim 3 wherein the mixture of halides includes silicon halide and at least one other halide.

5. The method of claim 1 wherein the oxide mixture formed in the flame is deposited on a support in particulate form and the body thus formed is subsequently vitrified by heat treatment.

6. The method of claim 1 wherein the oxide mixture is vitrified in the flame and is deposited in vitreous form.

7. A method in accordance with claim 1 wherein silicon halide vapors are generated separately by passing a carrier gas through silicon halide and the stream of gas and vapors thus formed is mixed with the stream of gas and vapors generated in the heated chamber and the mixture is passed through the flame of combustible gas.

* * * * *